United States Patent
Åström et al.

(10) Patent No.: US 11,096,058 B2
(45) Date of Patent: Aug. 17, 2021

(54) RECONFIGURATION OF COMMUNICATIONS DEVICES

(71) Applicant: Telefonaktiebolaget LM Ericsson (publ), Stockholm (SE)

(72) Inventors: Magnus Åström, Lund (SE); Patrik Ekdahl, Dalby (SE); Bengt Lindoff, Bjärred (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/636,928

(22) PCT Filed: Aug. 30, 2017

(86) PCT No.: PCT/EP2017/071783
§ 371 (c)(1),
(2) Date: Feb. 6, 2020

(87) PCT Pub. No.: WO2019/042540
PCT Pub. Date: Mar. 7, 2019

(65) Prior Publication Data
US 2020/0374693 A1    Nov. 26, 2020

(51) Int. Cl.
*H04W 24/02*         (2009.01)
*H04W 12/30*         (2021.01)
(Continued)

(52) U.S. Cl.
CPC ............ *H04W 12/35* (2021.01); *G06F 21/57* (2013.01); *H04L 67/34* (2013.01); *H04W 8/245* (2013.01); *H04W 24/02* (2013.01)

(58) Field of Classification Search
CPC .................................................... H04W 12/00
See application file for complete search history.

(56) References Cited

U.S. PATENT DOCUMENTS 7,363,022 B2 * 4/2008 Whelan ................... H04L 29/06
455/411
2012/0266223 A1 10/2012 Yegin et al.
(Continued)

FOREIGN PATENT DOCUMENTS

CN   104349373 A   2/2015
EP    3010205 A1   4/2016

OTHER PUBLICATIONS

Hesham, A. et al., "A Simplified Network Access Control Design and Implementation for M2M Communication Using SDN", 2017 IEEE Wireless Communications and Networking Conference Workshops, Mar. 19, 2017, pp. 1-5, IEEE.
(Continued)

*Primary Examiner* — Michael T Vu
(74) *Attorney, Agent, or Firm* — Coats & Bennett, PLLC

(57) ABSTRACT

There is provided mechanisms for handling a reconfiguration request for a communications device. A method is performed by the communications device. The method comprises wirelessly receiving the reconfiguration request from a radio access network node. The reconfiguration request originates from a server and is received together with digitally signed radio access layer information of the radio access network node. The method comprises verifying the digitally signed radio access layer information using an authorization process. The method comprises accepting the reconfiguration request only when having successfully verified the digitally signed radio access layer information.

20 Claims, 4 Drawing Sheets

(51) Int. Cl.
   *G06F 21/57*   (2013.01)
   *H04L 29/08*   (2006.01)
   *H04W 8/24*    (2009.01)

(56) References Cited

U.S. PATENT DOCUMENTS

2013/0310016 A1  11/2013  Park et al.
2013/0339438 A1  12/2013  Cherian et al.
2014/0328253 A1  11/2014  Lee et al.
2016/0226847 A1   8/2016  Bone et al.
2017/0359343 A1* 12/2017  Sterl .................... H04L 67/125

OTHER PUBLICATIONS

LG Eletroncis Inc., "Supporting RLC UM for NB-IoT", 3GPP TSG-RAN WG2 Meeting #99, Berlin, Germany, Aug. 21, 2017, pp. 1-2, R2-1708851, 3GPP.

* cited by examiner

RECONFIGURATION OF COMMUNICATIONS DEVICES

TECHNICAL FIELD

Embodiments presented herein relate to a method, a communications device, a core network node, computer programs, and a computer program product for handling a reconfiguration request for the communications device.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to provide secure reconfiguration of communications devices in the network.

As an example, some communications devices, such as wireless sensor devices, machine type communications devices, Internet of Things devices, etc., might have a wireless connection to the network, be stationary, and/or only transmit a small amount of data sparsely in time and hence may have battery life length of up to several years. For such applications several different cellular standards have been defined, for instance narrow-band Internet of Things (NB-IoT), enhanced machine type communications (eMTC), Sigfox, LoRa, etc.

Many communications devices have a planned life length of several years. Software updates on the application layer or firmware updates might therefore be needed for correct functionality during the life span of the communications device. Furthermore, the functionality of the communications device might be different depending on its geographical position, and hence the software update (or another reconfiguration) might be different depending on the actual geographical position of the communications device.

Furthermore, communications devices might continue to operate for years after their last software reconfiguration, and might even outlive the demise of their manufacturer. Additionally, many communications devices might be running low-power processor units incapable of supporting sophisticated security. This might cause the communications devices to be a target for possible hacker attacks. For instance, there is a potential risk of distributed denial of service (DDOS) attacks using communications devices to disrupt critical infrastructure, including for instance cellular communication systems.

One approach to hack a communications device is to reconfigure the communications devices with malicious software. The malicious software may, for instance, introduce erroneous functionality to the communications device with respect to its intended use.

Hence, there is a need for enabling reconfiguration of communications devices without exposing the communications devices to the threats or risks identified above.

SUMMARY

An object of embodiments herein is to provide secure reconfiguration of communications devices.

According to a first aspect there is presented a method for handling a reconfiguration request for a communications device. The method is performed by the communications device. The method comprises wirelessly receiving the reconfiguration request from a radio access network node. The reconfiguration request originates from a server and is received together with digitally signed radio access layer information of the radio access network node. The method comprises verifying the digitally signed radio access layer information using an authorization process. The method comprises accepting the reconfiguration request only when having successfully verified the digitally signed radio access layer information.

According to a second aspect there is presented a communications device for handling a reconfiguration request for the communications device. The communications device comprises processing circuitry. The processing circuitry is configured to cause the communications device to wirelessly receive the reconfiguration request from a radio access network node. The reconfiguration request originates from a server and is received together with digitally signed radio access layer information of the radio access network node. The processing circuitry is configured to cause the communications device to verify the digitally signed radio access layer information using an authorization process. The processing circuitry is configured to cause the communications device to accept the reconfiguration request only when having successfully verified the digitally signed radio access layer information.

According to a third aspect there is presented a communications device for handling a reconfiguration request for the communications device. The communications device comprises processing circuitry and a storage medium. The storage medium stores instructions that, when executed by the processing circuitry, cause the communications device to perform operations, or steps. The operations, or steps, cause the communications device to wirelessly receive the reconfiguration request from a radio access network node. The reconfiguration request originates from a server and is received together with digitally signed radio access layer information of the radio access network node. The operations, or steps, cause the communications device to verify the digitally signed radio access layer information using an authorization process. The operations, or steps, cause the communications device to accept the reconfiguration request only when having successfully verified the digitally signed radio access layer information.

According to a fourth aspect there is presented a communications device for handling a reconfiguration request for the communications device. The communications device comprises a receive module configured to wirelessly receive the reconfiguration request from a radio access network node. The reconfiguration request originates from a server and is received together with digitally signed radio access layer information of the radio access network node. The communications device comprises a verify module configured to verify the digitally signed radio access layer information using an authorization process. The communications device comprises an accept module configured to accept the reconfiguration request only when having successfully verified the digitally signed radio access layer information.

According to a fifth aspect there is presented a computer program for handling a reconfiguration request for a communications device. The computer program comprises computer program code which, when run on processing circuitry of the communications device, causes the communications device to perform a method according to the first aspect.

According to a sixth aspect there is presented a method for handling a reconfiguration request for a communications device. The method is performed by a core network node. The method comprises receiving the reconfiguration request from a server. The method comprises evaluating which radio access network node is to wirelessly transmit the reconfiguration request to the communications device. The method comprises digitally signing radio access layer information of the radio access network node. The method comprises forwarding the reconfiguration request together with the digitally signed radio access layer information to the radio access network node.

According to a seventh aspect there is presented a core network node for handling a reconfiguration request for a communications device. The core network node comprises processing circuitry. The processing circuitry is configured to cause the core network node to receive the reconfiguration request from a server. The processing circuitry is configured to cause the core network node to evaluate which radio access network node is to wirelessly transmit the reconfiguration request to the communications device. The processing circuitry is configured to cause the core network node to digitally sign radio access layer information of the radio access network node. The processing circuitry is configured to cause the core network node to forward the reconfiguration request together with the digitally signed radio access layer information to the radio access network node.

According to an eighth aspect there is presented a core network node for handling a reconfiguration request for a communications device. The core network node comprises processing circuitry and a storage medium. The storage medium stores instructions that, when executed by the processing circuitry, cause the core network node to perform operations, or steps. The operations, or steps, cause the core network node to receive the reconfiguration request from a server. The operations, or steps, cause the core network node to evaluate which radio access network node is to wirelessly transmit the reconfiguration request to the communications device. The operations, or steps, cause the core network node to digitally sign radio access layer information of the radio access network node. The operations, or steps, cause the core network node to forward the reconfiguration request together with the digitally signed radio access layer information to the radio access network node.

According to a ninth aspect there is presented a core network node for handling a reconfiguration request for a communications device. The core network node comprises a receive module configured to receive the reconfiguration request from a server. The core network node comprises an evaluate module configured to evaluate which radio access network node is to wirelessly transmit the reconfiguration request to the communications device. The core network node comprises a sign module configured to digitally sign radio access layer information of the radio access network node. The core network node comprises a forward module configured to forward the reconfiguration request together with the digitally signed radio access layer information to the radio access network node.

According to a tenth aspect there is presented a computer program for handling a reconfiguration request for a communications device, the computer program comprising computer program code which, when run on processing circuitry of a core network node, causes the core network node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these communications devices, these core network nodes, and these computer programs provide secure reconfiguration of the communications device.

Advantageously these methods, these communications devices, these core network nodes, and these computer programs protect the communications device from risks of being provided with malicious reconfigurations.

Advantageously these methods, these communications devices, these core network nodes, and these computer programs ensure that any reconfiguration of the communications device only is made for a certified and/or trusted geographical position, via a certified and/or trusted Radio Access Technology, core network node, and/or radio access network node, and hence reduce the risk for erroneous position based reconfiguration or malicious reconfiguration of the communications device.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
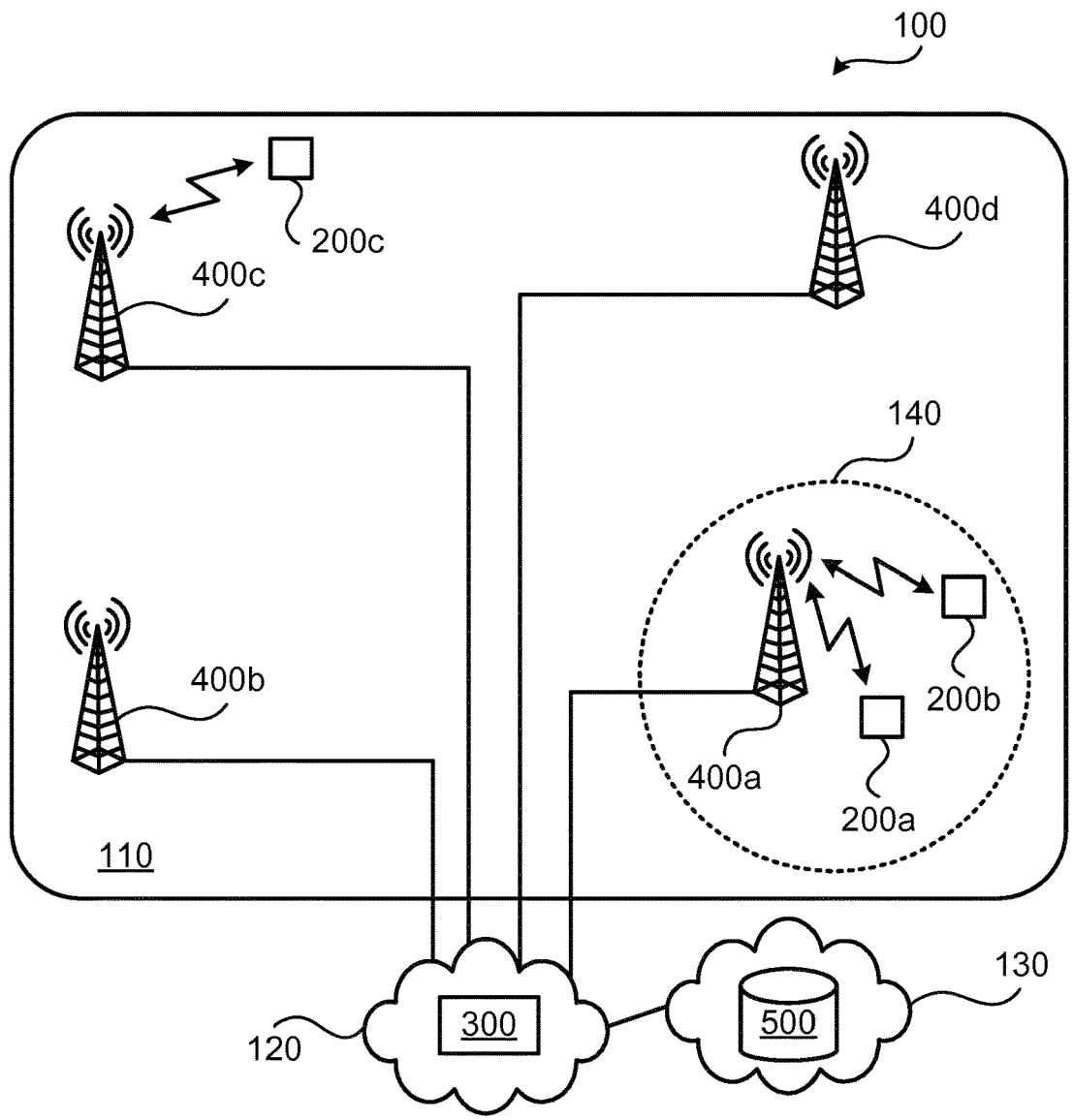
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard. The communications network 100 comprises a radio access network 110, a core network 120, and a service network 130.

Radio access network nodes 400a, 400b, 400c, 400d in the radio access network 110 are configured to provide network access to communications devices 200a, 200b, 200c. The communications devices 200a, 200b, 200c are thereby able to access services provided by, and exchange data with, a server 500 in the service network 130 via a core network node 300 in the core network 120. For example, the server 500 is configured to reconfigure the communications devices 200a, 200b, 200c.

Non-limiting examples of radio access network nodes 400a, 400b, 400c, 400d are radio base stations, base transceiver stations, node Bs, evolved node Bs g node Bs, access points, and access nodes. Non-limiting examples of communications devices 200a, 200b, 200c are portable wireless devices, mobile stations, mobile phones, handsets, wireless local loop phones, user equipment (UE), smartphones, laptop computers, tablet computers, wireless modems, wireless sensor devices, machine type communications (MTC) devices, Internet-of-Things (IoT) devices, and network equipped vehicles.

Assume for illustrative purposes that the server 500 requests a reconfiguration of only a subset of the communications devices 200a, 200b, 200c. The reconfiguration may be reconfiguration of certain parameters, but may also be a request for a software update; the herein disclosed embodiments are not limited to any particular reconfigurations except those that can be provided by a server 500.

Assume further for illustrative purposes that the reconfiguration is only valid for those communications devices located in a geographical area 140, but that the server 500 does not know exactly where the communications devices are located.

As disclosed above there is a risk of that the communications devices 200a, 200b, 200c are exposed to hacker attacks, where, for example, a hacker might try to reconfigure the communications devices 200a, 200b, 200c with malicious software.

Existing mechanisms for protecting communications devices against remote malicious, or erroneous, reconfiguration are based on authorization on the application layer in the Open Systems Interconnection (OSI) model, and hence is transparent to the radio access layer. That is, the authorization is independent of the radio access layer. There are several shortcomings with such an approach. For example, existing mechanisms could not use authorization/certification mechanisms that are used in the radio access layer for verification of the reconfiguration request. For example, existing mechanisms could not use spatial/geographical/ location based information inherent in stationary radio access network nodes 400a, 400b, 400c, 400d for position verification of the communications devices 200a, 200b, 200c when the communications devices 200a, 200b, 200c are requested to be reconfigured. The herein disclosed embodiments are therefore based on utilizing radio access information for verification of reconfiguration requests for the communications devices 200a, 200b, 200c.

According to embodiments disclosed herein the server 500 sends the reconfiguration request to all communications devices 200a, 200b, 200c via the core network 120 and the radio access network 110. According to embodiments disclosed herein the communications devices 200a, 200b, 200c are configured to, upon reception of the reconfiguration request, verify whether the reconfiguration is trusted/certified by verifying radio access layer information, as signed by the core network node 300 relating to those radio access network nodes located in the geographical area 140 of interest. In the illustrative example of FIG. 1 this would imply that communications device 200c will not successfully verify the radio access layer information since it is operatively connected to radio access network node 400c, which is located outside the geographical area 140. Other criteria can then be imposed to further limit the trust/ certification of the reconfiguration request such that the reconfiguration only is trusted/certified by one of communications devices 200a, 200b, although both these communications devices are located in the geographical area 140 served by radio access network node 400a.

The embodiments disclosed herein in particular relate to mechanisms for handling a reconfiguration request for a communications device 200a, 200b, 200ca. In order to obtain such mechanisms there is provided a communications device 200a, 200b, 200c, a method performed by the communications device 200a, 200b, 200c, a computer program product comprising code, for example in the form of a computer program, that when run on processing circuitry of the communications device 200a, 200b, 200c, causes the communications device 200a, 200b, 200c to perform the method. In order to obtain such mechanisms there is further provided a core network node 300, a method performed by the core network node 300, and a computer program product comprising code, for example in the form of a computer program, that when run on processing circuitry of the core network node 300, causes the core network node 300 to perform the method.

Figure 2:
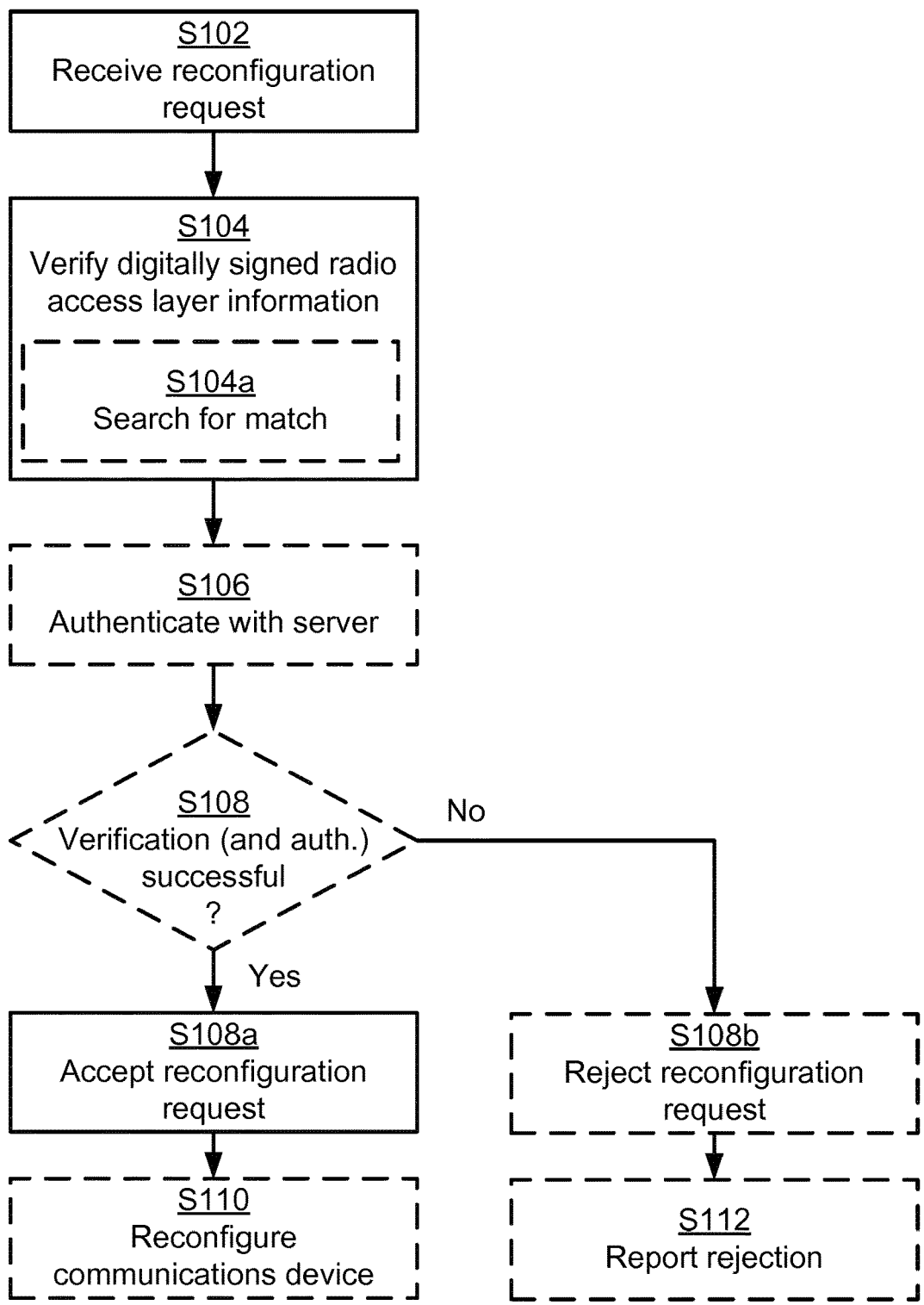
FIGS. 2, and 3 are flowcharts of methods according to embodiments.

Reference is now made to FIG. 2 illustrating a method for handling a reconfiguration request for a communications device 200a, 200b, 200c as performed by the communications device 200a, 200b, 200c according to an embodiment.

It is assumed that the communications device 200a, 200b, 200c wirelessly receives the reconfiguration request. Thus, the communications device 200a, 200b, 200c is configured to perform step S102:

S102: The communications device 200a, 200b, 200c wirelessly receives the reconfiguration request from a radio access network node 400a, 400b, 400c, 400d. The reconfiguration request originates from a server 500 and is received together with digitally signed radio access layer information of the radio access network node 400a, 400b, 400c, 400d.

Before accepting the reconfiguration request the communications device 200a, 200b, 200c checks whether the reconfiguration request is to be trusted or not. This check is performed using the received digitally signed radio access layer information. Particularly, the communications device 200a, 200b, 200c is configured to perform step S104:

S104: The communications device 200a, 200b, 200c verifies the digitally signed radio access layer information using an authorization process.

The outcome of the authorization process is either that the digitally signed radio access layer information is successfully verified, or that that the digitally signed radio access layer information is not successfully verified. In some aspects the radio access layer information is digitally signed by the core network node 300.

A check if whether the verification (as performed in step S104) is successful or not is implicitly made in step S108. The reconfiguration request is then only accepted in case the communications device 200a, 200b, 200c is able to verify the radio access layer information, i.e., upon successful verification of the digitally signed radio access layer information (step S108; Yes). That is, the communications device 200a, 200b, 200c is configured to perform step S108a as part of step S108:

S108a: The communications device 200a, 200b, 200c accepts the reconfiguration request only when having successfully verified the digitally signed radio access layer information.

How to handle the case where the digitally signed radio access layer information cannot be successfully verified will be disclosed below.

Embodiments relating to further details of handling a reconfiguration request for a communications device 200a, 200b, 200c as performed by the communications device 200a, 200b, 200c will now be disclosed.

If the verification fails, i.e., in case the digitally signed radio access layer information cannot be successfully verified, the communications device 200a, 200b, 200c rejects the reconfiguration request (step S108; No). Particularly, according to an embodiment the communications device 200a, 200b, 200c is configured to perform (optional) step S108b as part of step S108:

S108b: The communications device 200a, 200b, 200c rejects the reconfiguration request when not being able to successfully verify the digitally signed radio access layer information.

Step S108b is thus an alternative to step S108a and is entered in case the digitally signed radio access layer information cannot be successfully verified.

The communications device 200a, 200b, 200c could report the denied reconfiguration request to a remote server node. Particularly, according to an embodiment the communications device 200a, 200b, 200c is configured to perform (optional) step S112:

S112: The communications device 200a, 200b, 200c reports rejection of the reconfiguration request to a remote server node. The remote server node could be the server 500 from which the reconfiguration request was received. The reporting could, optionally, comprises information of the rationale for denial, i.e., information specifying as to why the reconfiguration request was rejected.

There may be different ways for the communications device 200a, 200b, 200c to receive the reconfiguration request. According to an embodiment the reconfiguration request is received in a message above radio access layer. That is, the reconfiguration request could be received as application, presentation, session, or transport, layer signalling.

There may be different ways for the communications device 200a, 200b, 200c to verify the digitally signed radio access layer information as in step S104. In some aspects the communications device 200a, 200b, 200c checks the received information against whitelisted information. Particularly, according to an embodiment the communications device 200a, 200b, 200c has access to a list of whitelisted radio access layer information. According to the embodiment the communications device 200a, 200b, 200c is configured to perform (optional) step S104a as part of verifying the digitally signed radio access layer information in step S104:

S104a: The communications device 200a, 200b, 200c searches for a match to the radio access layer information in the list. The reconfiguration request is accepted only when this match is found.

The communications device 200a, 200b, 200c could verify the reconfiguration request, for instance by comparing the radio access layer information towards allowed/trusted/certified radio access layer information in a data base. Whitelisted information is thus defined as already allowed/trusted/certified information.

There may be different examples of radio access layer information.

In some aspects the radio access layer information comprises an identifier of the radio access technology, the cell, the radio access network node, and/or the beam serving the communications device 200a, 200b, 200c. Further, the identifier may be a global or a local identifier.

Particular examples of such radio access layer information are public land mobile network identity (PLMN ID), for examples given as Mobile Country Code plus Mobile Network Code, Global network node (for examples given as PLMN ID+radio access network node ID), E-UTRAN Cell Global Identifier (ECGI) where UTRAN is short for Universal Terrestrial Radio Access Network, E-UTRAN Cell Identifier (ECI), Tracking Area Identity (TAI), and Tracking Area Code (TAC). The communications device 200a, 200b, 200c could then verify whether the radio access technology, the cell, the radio access network node, and/or the beam serving the communications device 200a, 200b, 200c is trusted/certified or not in order to allow for the reconfiguration. That is, according to an embodiment the radio access layer information comprises an identifier of at least one radio access parameter of that radio access network node 400a, 400b, 400c, 400d identified by the core network node 300 to transmit the reconfiguration request to the communications device 200a, 200b, 200c. The list of whitelisted radio access layer information could then comprise whitelisted identifiers, and the reconfiguration request is accepted only when the identifier matches one of the whitelisted identifiers.

In some aspects the radio access layer information comprises location information. For example, the radio access layer information might be included in an authenticated location messages, e.g. signed by the core network node 300. Thereby also connection properties or geographical location, or in short, an identifier of the server sending the reconfiguration request can be included during the verification in the communications device 200a, 200b, 200c. That is, according to an embodiment the radio access layer information comprises location information specifying a geographical area 140, and the reconfiguration request is intended for the communications device 200a, 200b, 200c only if the communications device 200a, 200b, 200c is located in the geographical area 140. The list of whitelisted radio access layer information could then comprise whitelisted locations, and the reconfiguration request is accepted only when the location information matches one of the whitelisted locations.

In some aspects the communications device 200a, 200b, 200c and the server 500 sending the reconfiguration request are mutually authenticated. Particularly, according to the embodiment the communications device 200a, 200b, 200c is configured to perform (optional) step S106:

S106: The communications device 200a, 200b, 200c authenticates with the server 500 before accepting the reconfiguration request. Step S106 is preferably performed before step S108.

A check if whether the authentication (as performed in step S106) is successful or not might implicitly be part of step S108.

That the communications device 200a, 200b, 200c authenticates with the server 500 could ensure authenticity of the reconfiguration request and thus further increase the trust of the reconfiguration request in addition to the verification of the digitally signed radio access layer information.

There could be different kinds of reconfiguration requests. In some aspects the reconfiguration request includes a set of reconfiguration parameters. Particularly, according to an embodiment the reconfiguration request comprises a set of reconfiguration parameters for the communications device 200a, 200b, 200c. For example, the reconfiguration request might include several parameters that need to be reconfigured. The reconfiguration parameters could relate to update of software or firmware at the communications device 200a, 200b, 200c. Particularly, according to an embodiment the set of reconfiguration parameters relate to a software upgrade of the communications device 200a, 200b, 200c and/or a firmware update of the communications device 200a, 200b, 200c. For example, the reconfiguration parameters might define an application layer software upgrade or a firmware upgrade.

There may be different ways for the communications device 200a, 200b, 200c to accept the reconfiguration request (i.e., if step S108a, and hence not step S108b, is entered). In some aspects, accepting the reconfiguration request involves reconfiguring the communications device 200a, 200b, 200c at least partly according to the reconfiguration request. Particularly, according to the embodiment the communications device 200a, 200b, 200c is configured to perform (optional) step S106:

S110: The communications device 200a, 200b, 200c reconfigured the communications device 200a, 200b, 200c according to the set of reconfiguration parameters.

In some aspects step S110 is part of accepting the reconfiguration request as in step S108a.

That is, if the verification of the digitally signed radio access layer information at least partly is successful, the communications device 200a, 200b, 200c accepts the reconfiguration request 160 (as in step s108a) and performs the reconfiguration (as in step S110).

There may be different ways for the communications device 200a, 200b, 200c to perform the reconfiguration.

In some aspects only a subset of the reconfiguration is performed. This could be the case when different parts of the reconfiguration request is valid for different radio access network nodes 400a, 400b, 400c, 400d. Particularly, according to an embodiment, the communications device 200a, 200b, 200c is reconfigured only for a subset of the set of reconfiguration parameters. This could be the case when only a subset of the reconfiguration is allowed for a specific radio access network node 400a, 400b, 400c, 400d. The subset of reconfigurations might be a function of the radio access layer information in order to enable only a subset of the reconfiguration to be allowed at certain radio access network node 400a, 400b, 400c, 400d. Particularly, according to an embodiment, which of the reconfiguration parameters to include in the subset is defined as a function of the radio access layer information. In some aspects there are at least two subsets.

In further aspects, different reconfiguration parameters might have different data bases. A subset of the reconfiguration parameters might thus be allowed for some radio access network node 400a, 400b, 400c, 400d, whilst another subset of the reconfiguration parameters might not. Particularly, according to an embodiment each of the two subsets is associated with its own list of whitelisted radio access layer information such as the lists of any two subsets only partly overlap. Further, each of the two subsets might be associated with its own server 500, and thus there might be two or more servers 500.

Figure 3:
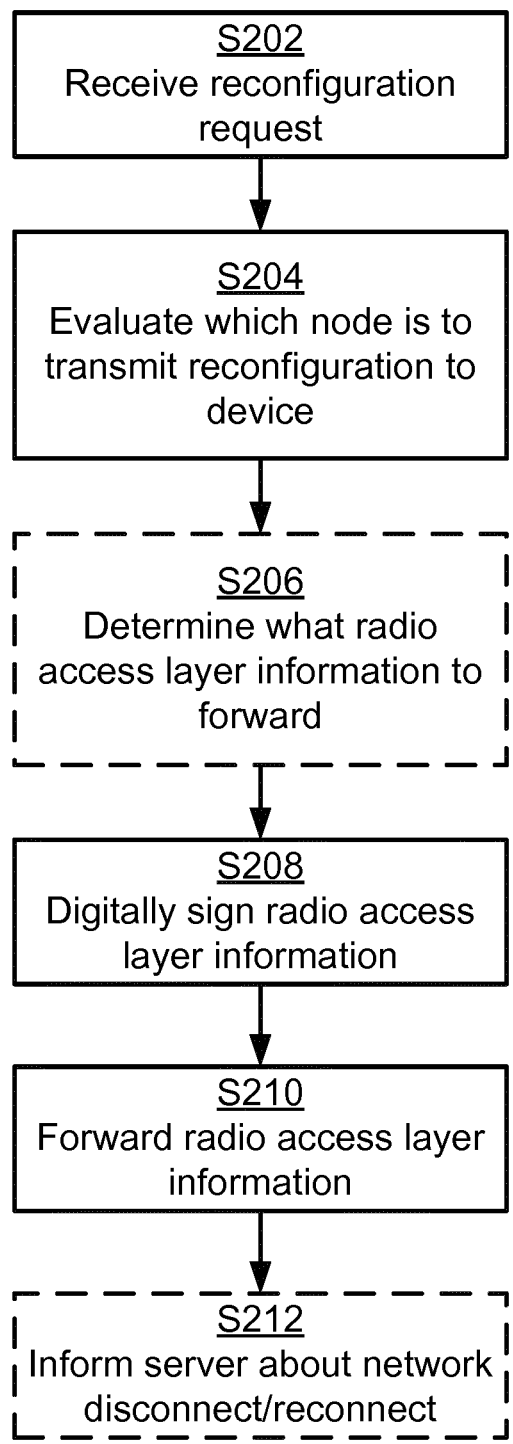

Reference is now made to FIG. 3 illustrating a method for handling a reconfiguration request for a communications device 200a, 200b, 200c as performed by the core network node 300 according to an embodiment.

As disclosed above, it is assumed that the server 500 requests at least one of the communications device 200a, 200b, 200c to be reconfigured. It is further assumed that the reconfiguration request is sent via the core network node 300. The core network node 300 is thus configured to perform step S202:

S202: The core network node 300 receives the reconfiguration request from a server 500.

The reconfiguration request is to be forwarded to a radio access network node 400a, 400b, 400c, 400d for wireless transmission to the communications device 200a, 200b, 200c. The core network node 300 thus needs to determine which radio access network node 400a, 400b, 400c, 400d is to be used for this wireless transmission. Particularly, the core network node 300 is configured to perform step S204:

S204: The core network node 300 evaluates which radio access network node 400a, 400b, 400c, 400d is to wirelessly transmit the reconfiguration request to the communications device 200a, 200b, 200c.

Further, in order to enable the communications device 200a, 200b, 200c to check whether the reconfiguration request is to be trusted or not the core network node 300 digitally signs radio access layer information of the radio access network node 400a, 400b, 400c, 400d selected for wireless transmission of the reconfiguration request to the communications device 200a, 200b, 200c. Particularly, the core network node 300 is configured to perform step S208:

S208: The core network node 300 digitally signs radio access layer information of the radio access network node 400a, 400b, 400c, 400d.

The reconfiguration request and the digitally signed radio access layer information is then forwarded to the radio access network node 400a, 400b, 400c, 400d selected for wireless transmission of the reconfiguration request to the communications device 200a, 200b, 200c. Particularly, the core network node 300 is configured to perform step S210:

S210: The core network node 300 forwards the reconfiguration request together with the digitally signed radio access layer information to the radio access network node 400a, 400b, 400c, 400d.

Embodiments relating to further details of handling a reconfiguration request for a communications device 200a, 200b, 200c as performed by the core network node 300 will now be disclosed.

There could be different ways for the core network node 300 to evaluate which radio access network node 400a, 400b, 400c, 400d is to wirelessly transmit the reconfiguration request to the communications device 200a, 200b, 200c as in step S204.

In some aspects the core network node 300 has access to current location information of the communications device 200a, 200b, 200c from the radio access network node 400a, 400b, 400c, 400d serving the communications device 200a, 200b, 200c. In a first example, during periods where the communications device 200a, 200b, 200c is in active mode, the core network node 300 might know which given radio access network node 400a, 400b, 400c, 400d that currently serves the communications device 200a, 200b, 200c from information received from that given radio access network node 400a, 400b, 400c, 400d. This enables the core network node 300 to know which radio access network node 400a, 400b, 400c, 400d is to wirelessly transmit the reconfiguration request to the communications device 200a, 200b, 200c. In a second example, during periods where the communications device 200a, 200b, 200c is in idle mode, the core network node 300 might know the tracking area of the communications device 200a, 200b, 200c by receiving tracking area information from one of the radio access network nodes 400a, 400b, 400c, 400d. In this latter example the core network node 300 might digitally sign radio access layer information of all radio access network nodes 400a, 400b, 400c, 400d in the tracking area and forward the reconfiguration request together with the digitally signed radio access layer information to all these radio access network nodes 400a, 400b, 400c, 400d.

In other aspects the core network node 300 does not have any access to current location information of the communications device 200a, 200b, 200c. The core network node 300 might then send out a paging request to the communications device 200a, 200b, 200c and then from the paging response from the communications device 200a, 200b, 200c, as received via one of the radio access network nodes 400a, 400b, 400c, 400d, know which given radio access network node 400a, 400b, 400c, 400d is associated with the communications device 200a, 200b, 200c. This enables the core network node 300 to know which radio access network node 400a, 400b, 400c, 400d is to wirelessly transmit the reconfiguration request to the communications device 200a, 200b, 200c.

As disclosed above, different parts of the reconfiguration request might be valid for different radio access network nodes 400a, 400b, 400c, 400d. Therefore, according to an embodiment the core network node 300 is configured to perform (optional) step S206:

S206: The core network node 300 determines what radio access layer information of the radio access network node 400a, 400b, 400c, 400d to forward to the radio access network node 400a, 400b, 400c, 400d.

Network service interruptions during the reconfiguration could indicate that the reconfiguration of the communications device 200a, 200b. 200c was not successful. In some aspects, the core network node 300 therefore keeps track of disconnections and reconnections of the communications device 200a, 200b, 200c. Such information could then be provided to the server 500. Particularly, according to an embodiment the core network node 300 is configured to perform (optional) step S212:

S212: The core network node 300 informs the server 500 about at least one of network disconnection and network reconnection of the communications device 200a, 200b, 200c.

In this way, the server 500 could be informed whenever the network connection of the communications device 200a, 200b, 200c fails during the reconfiguration of the communications device 200a, 200b, 200c. The core network node 300 could obtain information of the network disconnection and network reconnection of the communications device 200a, 200b, 200c in an explicit report from the communications device 200a, 200b, 200c to the network or implicitly by detecting that the communications device 200a, 200b, 200c is up and running again (after having been disconnected).

Figure 4:
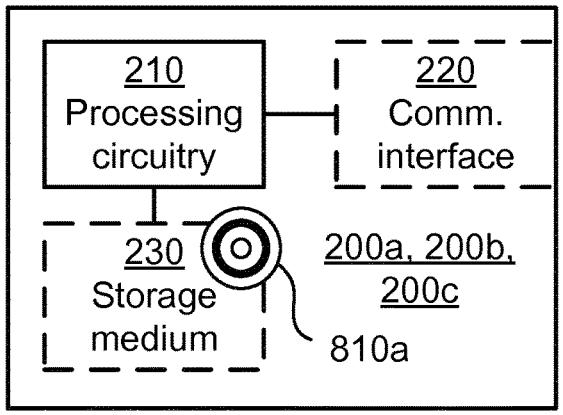
FIG. 4 is a schematic diagram showing functional units of a communications device according to an embodiment.

FIG. 4 schematically illustrates, in terms of a number of functional units, the components of a communications device 200a, 200b, 200c according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810a (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the communications device 200a, 200b, 200c to perform a set of operations, or steps, S102-S112, as disclosed above. For example, the storage medium 230 may store the set of operations, and the processing circuitry 210 may be configured to retrieve the set of operations from the storage medium 230 to cause the communications device 200a, 200b, 200c to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The communications device 200a, 200b, 200c may further comprise a communications interface 220 for communications with other entities, nodes, functions, and devices of the communications network 100. As such the communications interface 220 may comprise one or more transmitters and receivers, comprising analogue and digital components.

The processing circuitry 210 controls the general operation of the communications device 200a, 200b, 200c e.g. by sending data and control signals to the communications interface 220 and the storage medium 230, by receiving data and reports from the communications interface 220, and by retrieving data and instructions from the storage medium 230. Other components, as well as the related functionality, of the communications device 200a, 200b, 200c are omitted in order not to obscure the concepts presented herein.

Figure 5:
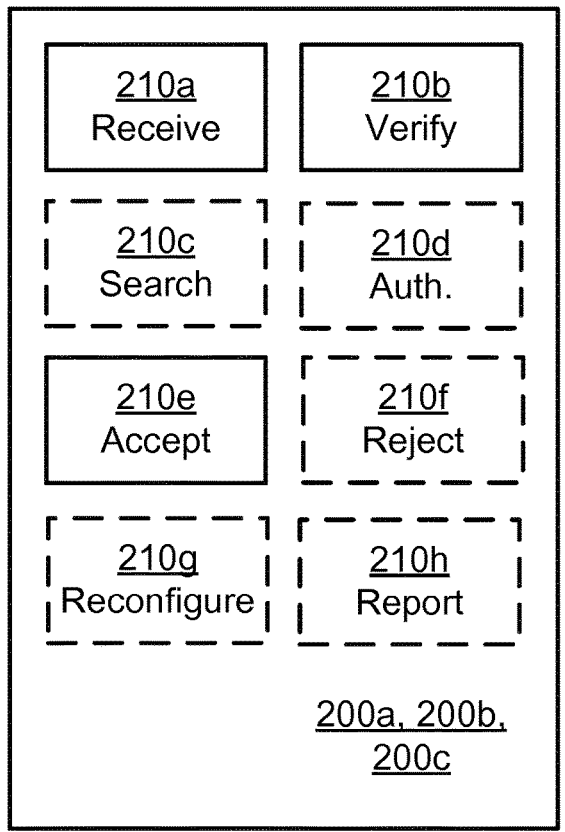
FIG. 5 is a schematic diagram showing functional modules of a communications device according to an embodiment.

FIG. 5 schematically illustrates, in terms of a number of functional modules, the components of a communications device 200a, 200b, 200c according to an embodiment. The communications device 200a, 200b, 200c of FIG. 5 comprises a number of functional modules; a receive module 210a configured to perform step S102, a verify module 210b configured to perform step S104, and an accept module 210e configured to perform step S108. The communications device 200a, 200b, 200c of FIG. 5 may further comprise a number of optional functional modules, such as any of a search module 210a configures to perform step S104a, an authentication module 210c configured to perform step S106, a reject module 210e configured to perform step S108b, a reconfigure module 210f configured to perform step S10, and a report module 210g configured to perform step S112. In general terms, each functional module 210a-210g may be implemented in hardware or in software. Preferably, one or more or all functional modules 210a-210g may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210g and to execute these instructions, thereby performing any steps of the communications device 200a, 200b, 200c as disclosed herein.

Figure 6:
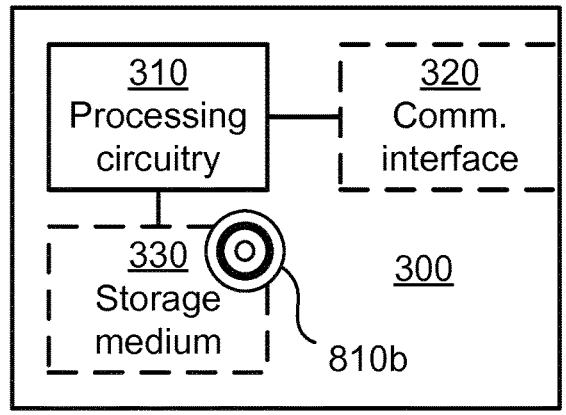
FIG. 6 is a schematic diagram showing functional units of a core network node according to an embodiment.

FIG. 6 schematically illustrates, in terms of a number of functional units, the components of a core network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 810b (as in FIG. 8), e.g. in the form of a storage medium 330. The processing circuitry 310 may further be provided as at least one application specific integrated circuit (ASIC), or field programmable gate array (FPGA).

Particularly, the processing circuitry 310 is configured to cause the core network node 300 to perform a set of operations, or steps, S202-S212, as disclosed above. For example, the storage medium 330 may store the set of operations, and the processing circuitry 310 may be configured to retrieve the set of operations from the storage medium 330 to cause the core network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The core network node 300 may further comprise a communications interface 320 for communications with other entities, nodes, functions, and devices of the communications network 100. As such the communications interface 320 may comprise one or more transmitters and receivers, comprising analogue and digital components.

The processing circuitry 310 controls the general operation of the core network node 300 e.g. by sending data and control signals to the communications interface 320 and the storage medium 330, by receiving data and reports from the communications interface 320, and by retrieving data and instructions from the storage medium 330. Other components, as well as the related functionality, of the core network node 300 are omitted in order not to obscure the concepts presented herein.

Figure 7:
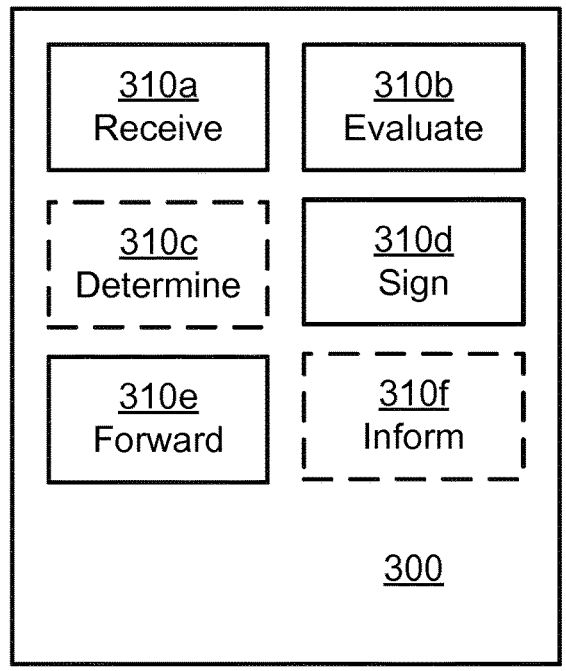
FIG. 7 is a schematic diagram showing functional modules of a core network node according to an embodiment.

FIG. 7 schematically illustrates, in terms of a number of functional modules, the components of a core network node 300 according to an embodiment. The core network node 300 of FIG. 7 comprises a number of functional modules; a receive module 310a configured to perform step S202, an evaluate module 310b configured to perform step S204, a sign module 310d configured to perform step S208, and a forward module 310e configured to perform step S210. The core network node 300 of FIG. 7 may further comprise a number of optional functional modules, such as any of a determine module 310c configured to perform step S206, and an inform module 310f configured to perform step S212. In general terms, each functional module 310a-310f may be implemented in hardware or in software. Preferably, one or more or all functional modules 310a-310f may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310f and to execute these instructions, thereby performing any steps of the core network node 300 as disclosed herein.

The core network node 300 may be provided as a standalone device or as a part of at least one further device. For example, as disclosed above the core network node 300 is provided in a node of the core network. Alternatively, functionality of the core network node 300 may be distributed between at least two devices, or nodes.

Thus, a first portion of the instructions performed by the core network node 300 may be executed in a first device, and a second portion of the of the instructions performed by the core network node 300 may be executed in a second device; the herein disclosed embodiments are not limited to any particular number of devices on which the instructions performed by the core network node 300 may be executed. Hence, the methods according to the herein disclosed embodiments are suitable to be performed by a core network node 300 residing in a cloud computational environment. Therefore, although a single processing circuitry 310 is illustrated in FIG. 6 the processing circuitry 310 may be distributed among a plurality of devices, or nodes. The same applies to the functional modules 310a-310f of FIG. 7 and the computer program 820b of FIG. 8 (see below).

Figure 8:
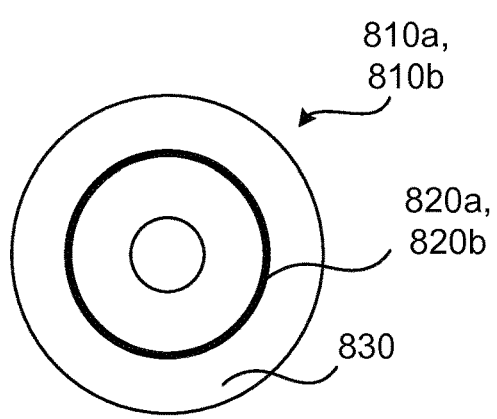
FIG. 8 shows one example of a computer program product comprising computer readable means according to an embodiment.

FIG. 8 shows one example of a computer program product 810a, 810b comprising computer readable means 830. On this computer readable means 830, a computer program 820a can be stored, which computer program 820a can cause the processing circuitry 210 and thereto operatively coupled entities and devices, such as the communications interface 220 and the storage medium 230, to execute methods according to embodiments described herein. The computer program 820a and/or computer program product 810a may thus provide means for performing any steps of the communications device 200a, 200b, 200c as herein disclosed. On this computer readable means 830, a computer program 820b can be stored, which computer program 820b can cause the processing circuitry 310 and thereto operatively coupled entities and devices, such as the communications interface 320 and the storage medium 330, to execute methods according to embodiments described herein. The computer program 820b and/or computer program product 810b may thus provide means for performing any steps of the core network node 300 as herein disclosed.

In the example of FIG. 8, the computer program product 810a, 810b is illustrated as an optical disc, such as a CD (compact disc) or a DVD (digital versatile disc) or a Blu-Ray disc. The computer program product 810a, 810b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820a, 820b is here schematically shown as a track on the depicted optical disk, the computer program 820a, 820b can be stored in any way which is suitable for the computer program product 810a, 810b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling a reconfiguration request for a communications device, the method comprising the communications device:
   wirelessly receiving the reconfiguration request from a radio access network node, the reconfiguration request originating from a server and being received together with digitally signed radio access layer information of the radio access network node;
   verifying the digitally signed radio access layer information using an authorization process; and
   accepting the reconfiguration request only when having successfully verified the digitally signed radio access layer information.

2. The method of claim 1, further comprising rejecting the reconfiguration request in response to not being able to successfully verify the digitally signed radio access layer information.

3. The method of claim 2, further comprising reporting rejection of the reconfiguration request to a remote server node.

4. The method of claim 1:
   wherein the communications device has access to a list of whitelisted radio access layer information;
   wherein the verifying the digitally signed radio access layer information comprises searching for a match to the radio access layer information in the list; and
   wherein the reconfiguration request is accepted only when this match is found.

5. The method of claim 4:
   wherein the radio access layer information is digitally signed by a core network node;
   wherein the radio access layer information comprises an identifier of at least one radio access parameter of that radio access network node identified by the core network node to transmit the reconfiguration request to the communications device;
   wherein the list of whitelisted radio access layer information comprises whitelisted identifiers; and
   wherein the reconfiguration request is accepted only when the identifier matches one of the whitelisted identifiers.

6. The method of claim 4:
   wherein the radio access layer information comprises location information specifying a geographical area; and
   wherein the reconfiguration request is intended for the communications device only if the communications device is located in the geographical area; and
   wherein the list of whitelisted radio access layer information comprises whitelisted locations; and
   wherein the reconfiguration request is accepted only when the location information matches one of the whitelisted locations.

7. The method of claim 1, wherein the radio access layer information is digitally signed by a core network node.

8. The method of claim 7, wherein the radio access layer information comprises an identifier of at least one radio access parameter of that radio access network node identified by the core network node to transmit the reconfiguration request to the communications device.

9. The method of claim 1:
   wherein the radio access layer information comprises location information specifying a geographical area; and
   wherein the reconfiguration request is intended for the communications device only if the communications device is located in the geographical area.

10. The method of claim 1, wherein the reconfiguration request comprises a set of reconfiguration parameters for the communications device.

11. The method of claim 10, wherein accepting the reconfiguration request comprises reconfiguring the communications device according to the set of reconfiguration parameters.

12. The method of claim 10, wherein the set of reconfiguration parameters relate to a software upgrade of the communications device and/or a firmware update of the communications device.

13. The method of claim 11, wherein the communications device is reconfigured only for a subset of the set of reconfiguration parameters.

14. The method of claim 13, wherein which of the reconfiguration parameters to include in the subset is defined as a function of the radio access layer information.

15. The method of claim 13, wherein there are at least two subsets.

16. A method for handling a reconfiguration request for a communications device, the method comprising a core network node:
   receiving the reconfiguration request from a server;
   evaluating which radio access network node is to wirelessly transmit the reconfiguration request to the communications device;
   digitally signing radio access layer information of the radio access network node; and
   forwarding the reconfiguration request together with the digitally signed radio access layer information to the radio access network node.

17. The method of claim 16, further comprising determining what radio access layer information of the radio access network node to forward to the radio access network node.

18. The method of claim 16, further comprising informing the server about network disconnection and/or network reconnection of the communications device.

19. A communications device for handling a reconfiguration request for the communications device, the communications device comprising:
   processing circuitry; and
   memory containing instructions executable by the processing circuitry whereby the communications device is operative to:
      wirelessly receive the reconfiguration request from a radio access network node, the reconfiguration request originating from a server and being received together with digitally signed radio access layer information of the radio access network node;
      verify the digitally signed radio access layer information using an authorization process; and
      accept the reconfiguration request only when having successfully verified the digitally signed radio access layer information.

20. A core network node for handling a reconfiguration request for a communications device, the core network node comprising:
   processing circuitry; and
   memory containing instructions executable by the processing circuitry whereby the core network node is operative to:
      receive the reconfiguration request from a server;

evaluate which radio access network node is to wirelessly transmit the reconfiguration request to the communications device;
digitally sign radio access layer information of the radio access network node; and
forward the reconfiguration request together with the digitally signed radio access layer information to the radio access network node.

\* \* \* \* \*